(12) United States Patent
Borøy et al.

(10) Patent No.: US 11,453,464 B2
(45) Date of Patent: Sep. 27, 2022

(54) ELECTROHYDRAULIC DEVICE, METHOD, AND MARINE VESSEL OR PLATFORM

(71) Applicant: National Oilwell Varco Norway AS, Kristiansand (NO)

(72) Inventors: Yngvar Borøy, Søgne (NO); Thor Strand, Kristiansand (NO); Geir Odd Bergstøl, Brennåsen (NO)

(73) Assignee: National Oilwell Varco Norway AS

( * ) Notice: Subject to any disclaimer, the term of this patent is extended or adjusted under 35 U.S.C. 154(b) by 295 days.

(21) Appl. No.: 16/644,463

(22) PCT Filed: Sep. 7, 2018

(86) PCT No.: PCT/NO2018/050224
§ 371 (c)(1),
(2) Date: Mar. 4, 2020

(87) PCT Pub. No.: WO2019/050413
PCT Pub. Date: Mar. 14, 2019

(65) Prior Publication Data
US 2021/0061421 A1 Mar. 4, 2021

(30) Foreign Application Priority Data
Sep. 8, 2017 (EP) .................................... 17190129

(51) Int. Cl.
*B63B 27/36* (2006.01)
*F15B 15/08* (2006.01)
*H02K 7/116* (2006.01)
*B66C 23/52* (2006.01)
*F16H 1/06* (2006.01)

(52) U.S. Cl.
CPC ............ *B63B 27/36* (2013.01); *F15B 15/088* (2013.01); *H02K 7/116* (2013.01); *B66C 23/52* (2013.01); *F16H 1/06* (2013.01)

(58) Field of Classification Search
CPC ....... B63B 27/36; F15B 15/088; H02K 7/116; B66C 23/52; F16H 1/06
See application file for complete search history.

(56) References Cited

U.S. PATENT DOCUMENTS 2,918,795 A 12/1959 Marien
2010/0107864 A1 5/2010 Bushner
(Continued)

FOREIGN PATENT DOCUMENTS

EP 2570343 A2 3/2013
WO 2017018886 2/2017

OTHER PUBLICATIONS

Written Opinion for PCT/NO2018/050224 dated Nov. 16, 2018 (6 pages).
(Continued)

*Primary Examiner* — Stephen P Avila
(74) *Attorney, Agent, or Firm* — Conley Rose, P.C.

(57) ABSTRACT

An electrohydraulic device includes an extender which is arranged to be actuated by hydraulic fluid, and a rotor of an electric motor, the rotor being arranged to rotate about a part of the extender. The rotor may have an annular body which encircles or surrounds part of the extender. There is also described a related method of use and a marine vessel or platform where the device may be applied.

12 Claims, 6 Drawing Sheets

(56) References Cited

U.S. PATENT DOCUMENTS

| | | | |
|---|---|---|---|
| 2016/0059410 A1* | 3/2016 | Staab | B25J 9/142 |
| | | | 901/22 |
| 2016/0144936 A1* | 5/2016 | Sim | B08B 7/04 |
| | | | 134/6 |

OTHER PUBLICATIONS

International Search Report for PCT/NO2018/050224 dated Nov. 16, 2018 (3 pages).

* cited by examiner

● Centre of mass
✳ Loading point ated with the prior art.

ELECTROHYDRAULIC DEVICE, METHOD, AND MARINE VESSEL OR PLATFORM

CROSS REFERENCE TO RELATED APPLICATIONS

This application is a 35 U.S.C. § 371 national stage application of PCT/NO2018/050224 filed Sep. 7, 2018 and entitled "Electrohydraulic Device, Method, and Marine Vessel or Platform", which claims priority to European Patent Application No. 17190129.1 filed Sep. 8, 2017, each of which is incorporated herein by reference in their entirety for all purposes.

STATEMENT REGARDING FEDERALLY SPONSORED RESEARCH OR DEVELOPMENT

Not Applicable.

FIELD OF THE DISCLOSURE

This disclosure relates in particular to an electrohydraulic devices and their use such as their employment in large-scale machinery, like cranes for lifting and lowering loads,

BACKGROUND

The supply of hydraulic fluid to hydraulically driven machinery is generally achieved by means of hydraulic circuit. The hydraulic circuit may drive an actuator such as a piston arm arranged to extend and retract for instance in order to lift or lower a boom of a crane or the like. Hydraulic fluid may be communicated from a hydraulic supply through pipework, e.g. by control of valves, into a chamber of the actuator by which the fluid can exert pressure against a drive surface in order to move the piston arm. In order to obtain the necessary power, a pump may operate to pump the hydraulic fluid through the circuit to the chamber, and as is known, such a pump may in turn be driven by an electrical motor.

It is evident that several components need to be able to cooperate in delivering the necessary hydraulic power. Where power needs are large, such as in large-scale machinery like cranes for lifting and lowering loads, the components are generally also large scale and it becomes an important consideration as to how to arrange the necessary components and equipment. In particular, there may be a need to avoid interfering with other operations.

On marine vessels or platforms, an A-frame crane is often utilised to help with deploying equipment in the water adjacent to the vessel or platform. At the rear of a ship for instance, the A-frame may typically consist of a boom with two legs on either side of the ship, with the legs being joined at the top by a cross-beam forming an "A" shape. The legs are pivoted at the deck to tilt the A-frame about a horizontal axis over the stern of the ship. A large hydraulic cylinder for each leg is provided to deliver power in order to lift, lower, or hold the A-frame in different positions of tilt. An example is illustrated in FIG. 1. In the prior art of FIG. 1, an A-frame 1 on the deck 2 of a vessel is positioned and manipulated by hydraulic actuators in the form of linear extenders 3. Each leg of the A-frame is connected to the deck 2 by pivot 4, which allows the A-frame 1 to tilt with respect to the deck 2 about a horizontal pivot axes. The A-frame is tilted by extending the actuator. The amount of tilt is dictated by the extent to which the actuator 3 is extended.

It is typically important for the deck space between the legs of such an A-frame to remain free, for example to allow room for preparing the equipment on deck for deployment. To achieve this, the conventional solution for the hydraulic system is to have a hydraulic power unit (HPU) positioned on the cross beam centrally between the legs of the A frame, where the necessary motor, pumps, control valving, etc., are contained. In this way, the HPU is elevated above and well out of the way of the deck area. In order to service the hydraulic power unit however, personnel typically need to climb onto a gantry elevated high-up upon the cross beam in order to perform the service, sometimes also while the frame is in its extended position (i.e. tilted over the stern of the ship). Although this conventional solution can meet requirements in terms of keeping deck space free, it may suffer in the need for personnel access onto the gantry on the cross beam, for example making servicing risky, inconvenient, and/or time-consuming.

SUMMARY OF THE DISCLOSURE

The inventors have thus identified a need for improved solutions in the arrangement of A-frames, or similar structures, where deck space constraints such as those described above are significant. At least one aim of the present disclosure is to provide a way to alleviate such a need, or obviate or at least mitigate one or more drawbacks associated with the prior art.

In view of the above, according to a first aspect of the disclosure, there is provided an electrohydraulic device comprising: an extender arranged to be actuated by hydraulic fluid; and a rotor of an electric motor, the rotor being arranged to rotate about a part of the extender.

The rotor preferably comprises a rotatable body which encircles or surrounds said part of the extender. The rotatable body may be a ring or a sleeve, as specific examples.

The rotor may be further arranged to drive a pump for pumping the hydraulic fluid. By way of operating the pump, the hydraulic fluid may enter a hydraulic chamber of the extender. The rotor may be coupled to the pump e.g. via a drive shaft of the pump. By rotation of the rotor, the drive shaft may be turned. The rotor may be coupled to the drive shaft through at least one planetary gear. The planetary gear may engage with a periphery of the rotor. The rate of rotation of the drive shaft may be controlled according to a ratio of a diameter of the rotor and a diameter of the planetary gear. The device may include the pump on the extender. The drive shaft of the pump may typically extend along the extender on an outside thereof. Such manner of coupling can be convenient, and through this may also facilitate use of the motor with an off-the-shelf pump.

The extender may comprise first and second sections which are movably coupled, and the part of the extender about which the rotor is arranged to rotate may be a part of the first or second section. The coupled first and second sections may be operable to extend or retract. Preferably, the extender is arranged to produce linear motion of the first section with respect to the second section. Typically, the extender may be elongate and the respective sections may also be elongate, and may be operable to extend or retract to vary or obtain a desired amount of elongation.

More specifically, the extender may comprise a hydraulic cylinder, and said part the extender, about which the rotor is arranged to rotate, may be a part of the hydraulic cylinder. The hydraulic cylinder may have a chamber for containing hydraulic fluid for actuating the extender. The hydraulic fluid in the chamber may exert a pressure against surfaces for extending, retracting, or supporting the first and second sections of the extender in position. The extender may be operated by way of the hydraulic fluid to support, move, or manipulate an applied external load.

The extender may comprise a rod, and said part the extender, about which the rotor is arranged to rotate, may be a part of the rod. The rod may be movable with respect to the hydraulic cylinder to extend or retract to vary or obtain a desired amount of extension or elongation of the extender.

It can be appreciated that the extender may have a longitudinal axis and the rotor may rotate in use about the longitudinal axis. The extender may be configured to produce linear axial extension along the longitudinal axis.

The device may include the electric motor which may typically comprise a stator in addition to the rotor. The electric motor is preferably disposed on the extender. The motor may operate in use using electrical energy to drive the rotation of the rotor.

The stator may comprise an outer ring or sleeve and the rotor may comprise an inner ring or sleeve on an inside of the outer ring or sleeve. The stator and rotor may be mounted inside a motor casing which may be fixedly attached to the extender. The motor casing may be an annular casing around said part of the extender to accommodate the stator and/or rotor. The rotor may be coupled to the drive shaft of the pump through the motor casing. The pump may have a pump casing. The pump casing may be mounted on an outside of the motor casing.

The device may include a tank. The tank may be provided on or incorporated in a part of the extender. The tank may be configured for storing hydraulic fluid. The tank may have an annular or part-annular storage space for hydraulic fluid, where the storage space may be disposed along a circumference around a part of the extender.

The pump may be positioned on an outside of a part of the extender. The pump may be positioned in a discrete location along the circumference around a part of the extender.

The pump, the tank, and the extender may be coupled together in a hydraulic circuit. Pipe-work may be provided for communicating hydraulic fluid between any two of the pump, the tank, and a hydraulic chamber of the extender. The hydraulic fluid may in this way be applied and communicated appropriately to actuate the extender in the required fashion. The device may be provided with valves which may be operable to control the communication or flow of the hydraulic fluid. The valves may be operated in response to control signals, e.g. by remote control means.

The device may be operable for manoeuvring or supporting a structure to which it is connected. When applied to the structure, the device may be subjected to a load from the structure. Such a structure may be a boom or an arm of crane, or a leg of an A-frame, which may reach over a side of deck of a marine vessel or other platform. The structure may also be arranged to suspend equipment from the structure, e.g. on a crane wire. The suspended equipment may add to the applied load.

The extender may be connected to the structure to tilt the member. In the case of an A-frame, the extender may be connected at location along a leg of the A-frame, so as to be able to manipulate the A-frame by tilting the leg with respect to the deck. A first end of the extender may be connected to the leg and a second end of the extender may be connected to the deck. By linear axial extension or retraction of the extender, the member may be tilted.

According to a second aspect of the disclosure, there is provided a marine vessel or platform comprising: a structure supported on a deck of the vessel or platform; and an electrohydraulic device as set out in the first aspect, connected to the structure, and operable to actuate the extender to manoeuvre or support the structure in position relative to the vessel or platform.

According to a third aspect of the disclosure, there is provided a method of using the electrohydraulic device of the first aspect of the disclosure, the method comprising at least a step of operating the extender, using the electric motor so as to rotate the rotor about a part of the extender.

Embodiments of the disclosure can be advantageous in various ways, as will be apparent from throughout the specification. For example, through the arrangement of the rotor, and the other components of the hydraulic circuitry on the extender, the device may be highly compact. Ring based rotors can also be efficient. Compared with prior art, the application of the device to an A-frame or crane boom on a vessel may allow for components of a hydraulic power supply to be more conveniently placed for access, service, and maintenance while space on deck in and around the A-frame and crane boom may remain free for other uses. In certain embodiments, the rotor can be provided to encircle the extender so as to avoid affecting the fundamental structural integrity or behaviour of the extender. For instance, the motor may be readily retrofit installed onto well-proven and tested actuators. This may allow the extender to be actuated and transmit force to support applied loads in a known predictable manner. A greater diameter of an elongate extender, e.g. the shafts, rod, or hydraulic cylinder of the extender, may require the rotor ring to be of a greater diameter to fit around the extender. The greater diameter, in addition to increasing the strength and power deliverable by the extender, may allow an increase in torque producible by the electric motor. Fluid may thus be more easily supplied from the pump to the higher pressures as may be needed on large scale device, e.g. for large machinery. Thus, the solutions and embodiments thus summarized may be 'scalable' in efficiency.

Any of the above aspects of the disclosure may include further features as described in relation to any other aspect, wherever described herein. Features described in one embodiment may be combined in other embodiments. For example, a selected feature from a first embodiment that is compatible with the arrangement in a second embodiment may be employed, e.g. as an additional, alternative or optional feature, e.g. inserted or exchanged for a similar or like feature, in the second embodiment to perform (in the second embodiment) in the same or corresponding manner as it does in the first embodiment.

BRIEF DESCRIPTION OF DRAWINGS

There will now be described, by way of example only, embodiments of the disclosure with reference to the accompanying drawings, in which.

DETAILED DESCRIPTION OF THE DISCLOSED EXEMPLARY EMBODIMENTS

Figure 1:
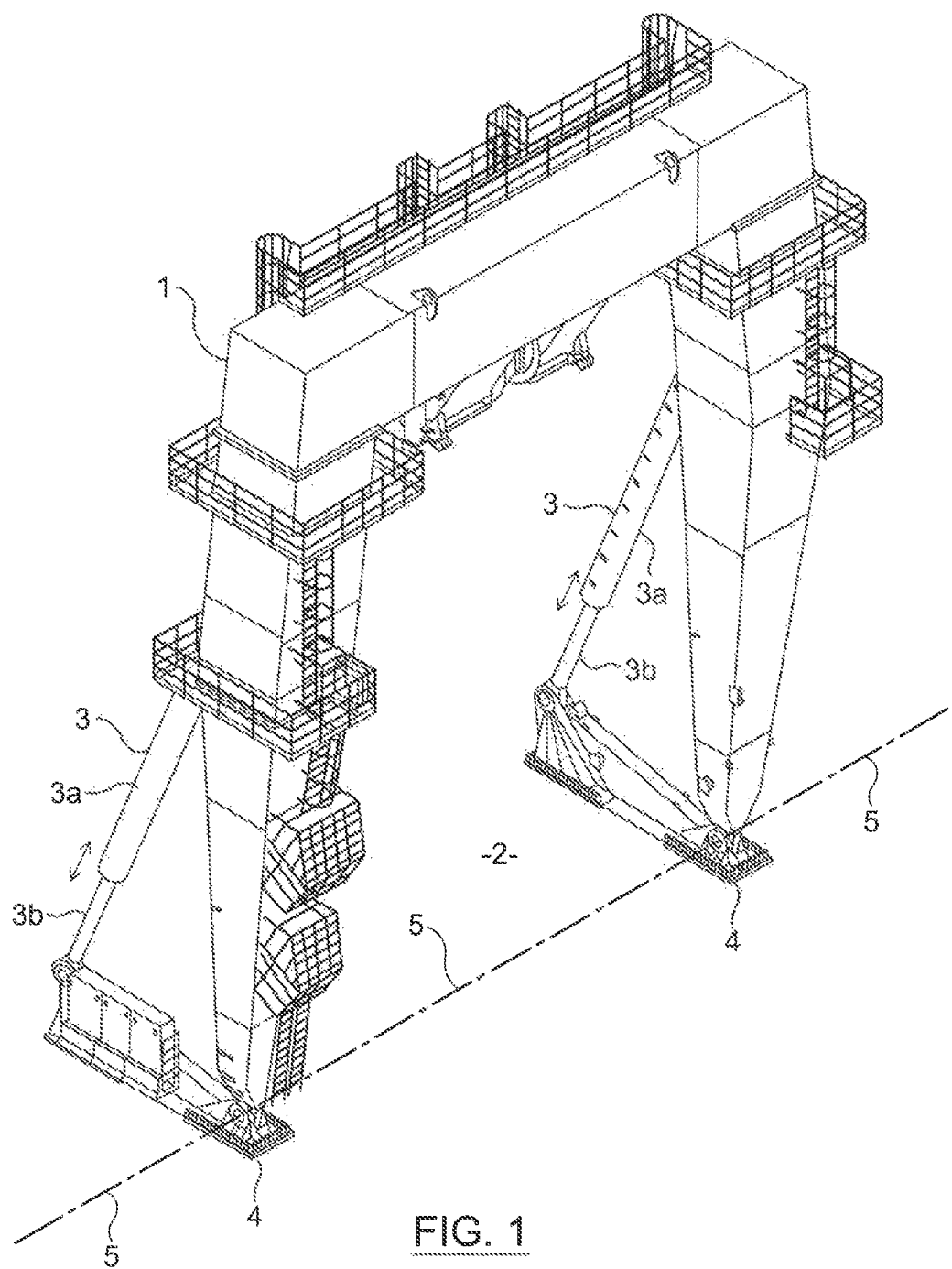
FIG. 1 is an example of a prior art vessel using an A-frame manoeuvrable by extenders.
Figure 2:
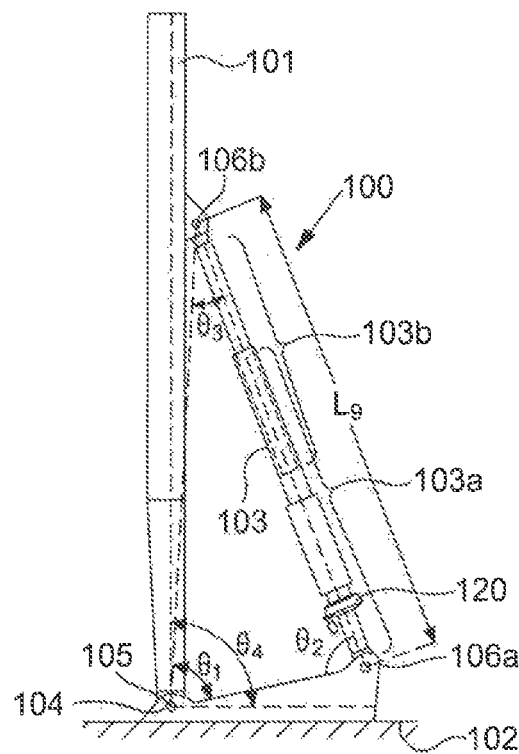
FIG. 2 is a schematic side representation an electrohydraulic device according to an embodiment of the disclosure applied in use to an A-frame in a first, upright configuration.
Figure 3:
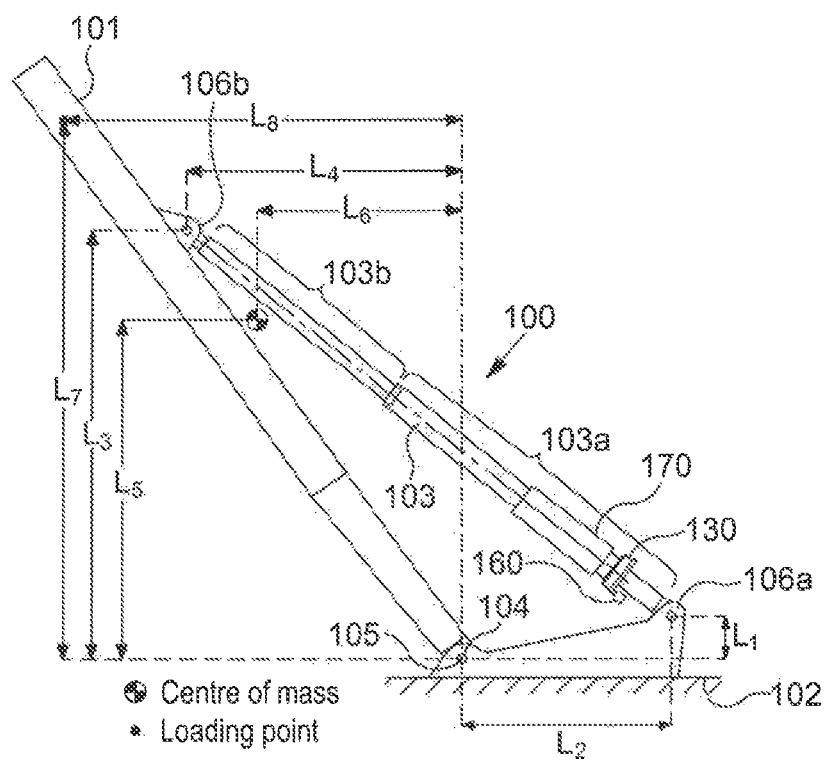
FIG. 3 is a schematic side representation of FIG. 2 applied to the A-frame in a second, tilted configuration.

Turning first to FIGS. 2 and 3, according to an embodiment of the disclosure, an electrohydraulic device 100 is depicted which includes a hydraulic actuator in the form of an extender 103, in this example used for positioning and manipulating an A-frame 101 on a deck 102 of a vessel. The extender 103 is actuated by hydraulic fluid and operates in the example to tilt the A-frame 101 by way of axial extension of the extender 103 between the deck 102 and the A-frame 101. The extender 103 has first end 106a which is connected to the deck and a second end 106b which is connected to the leg of the A-frame 101. The first end 106a is an end of a first section 103a of the extender, and the second end 106b is an end of a second section 103b of the extender.

The first and second sections 103a, 103b are telescopically and movably coupled to one another, so that by telescoping action, the first section 103a can be axially translated relative to the second section 103b, so as to vary the end-to-end length of the extender 103.

In the configuration of FIG. 3, the extender 103 is extended to have a greater length than in the configuration of FIG. 2. The first section 103a of the extender is stroked out telescopically from the second part 103b of the extender by a greater amount. The A-frame 104 is tilted to a greater extent accordingly. The ends 106a, 106b of the extender 103 are pivot connected to the deck and A-frame respectively so that the extender 103 extends linearly while also adapting its orientation as the A-frame is tilted. As can be seen, the A-frame 104 is connected to the deck 102 at a pivot 104 and is arranged to tilt about a horizontal pivot axis 105.

An electric motor 130 is arranged on the extender 103, as will be described in further detail in the following, in addition to a pump 160, and a tank 170. The electric motor 130 has a rotor 141 arranged to rotate about a circumference of the first part 103a of the extender.

Figure 4:
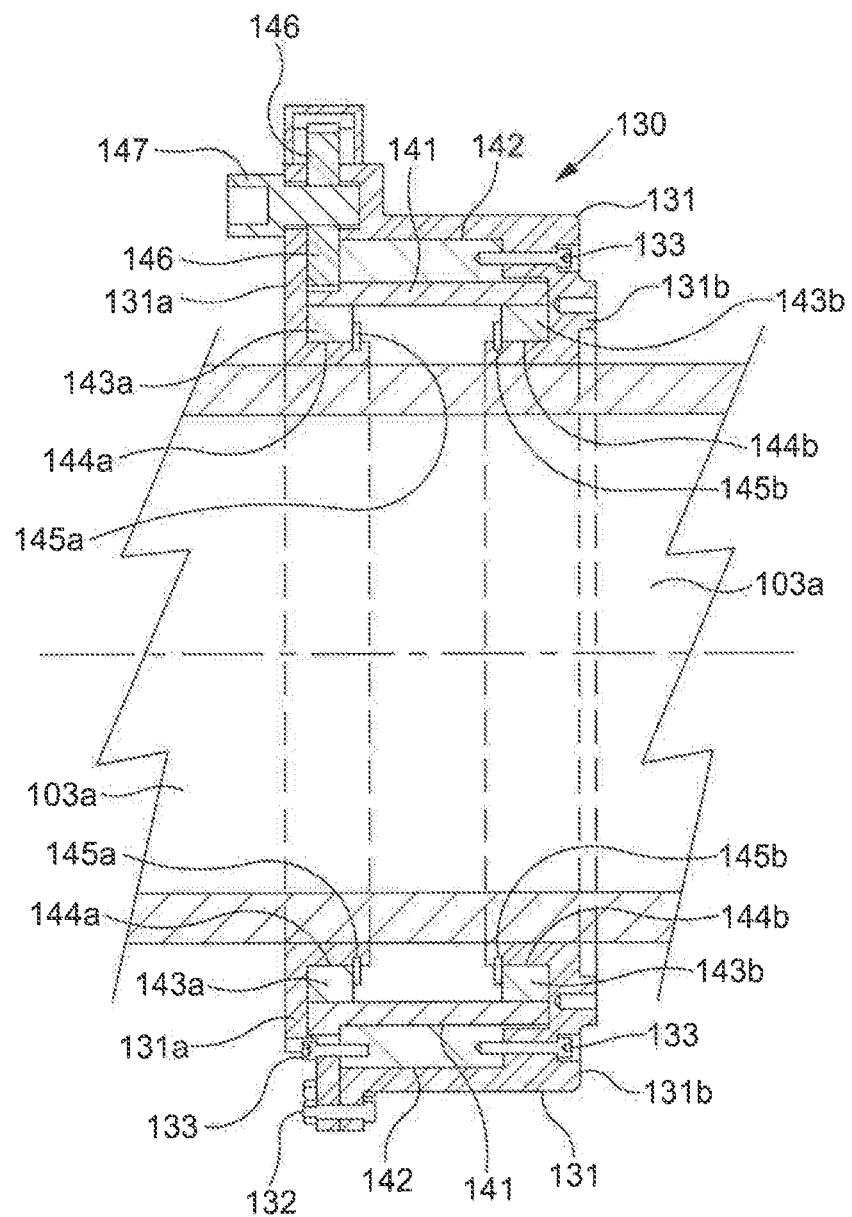
FIG. 4 is a cross-sectional representation in close up of an electric motor of the electrohydraulic device of FIGS. 2 and 3, according to an embodiment of the disclosure.

In FIG. 4, the electric motor 130 is shown in close-up. The motor 130 includes a rotor 141 which has an annular body, e.g. in the form of a ring or sleeve, around the first part 103a of the actuator 103. The rotor 141 thus comprises a ring surrounding the shaft and is operable to be rotated about the shaft, when the motor is activated.

The motor 103 has a casing 131 having first and second parts 131a, 131b connected together and fastened by fasteners 132. In this example, the casing 131 is mounted onto an outside of the section 103a of the extender, although in general it may be similarly mounted in different locations along the extender. The part 103a is in the form of a shaft.

The rotor 141 is housed on an inside of the casing 131. The rotor 141 is supported on the shaft on bearings 143a, 143b. The bearings 143a, 143b are arranged on collars 144a, 144b of the casing 131, and are held in place by circlips 145a, 145b. The rotor 141 bears against the bearings 143a, 143b as it rotates. The bearings can facilitate positioning the rotor 141 within the casing 131 and may reduce friction effects.

The motor 130 further includes a stator 142 which in this example also has an annular body constituting a ring or sleeve which surrounds the rotor 141. The stator 142 is fixed to the casing 131 by fasteners 133. The stator 142 comprises electrical windings (not shown) configured to be connected to an electrical power supply to operate the motor to turn the rotor 141 about the shaft. The motor may thus have an electrical connector (not shown) for transmitting electrical power to the motor.

The motor 130 is configured to be arranged to drive the pump 160. To this end, the motor 130 has a planetary gear 146 in engagement with gear ring around an outer rim of the body of the rotor 141. The gear 146 has a central axial extension 147 for connection with a drive shaft of the pump. The gear 146 is driven to rotate by rotation of the rotor 141, at a rate dependent upon the diameter ratio of the rotor 141 and the gear 146, and the speed of the rotor. By way of the engagement with the rotor, torque generated by rotation of the rotor 141 can be transmitted directly and efficiently to the drive shaft of the pump.

Figure 5:
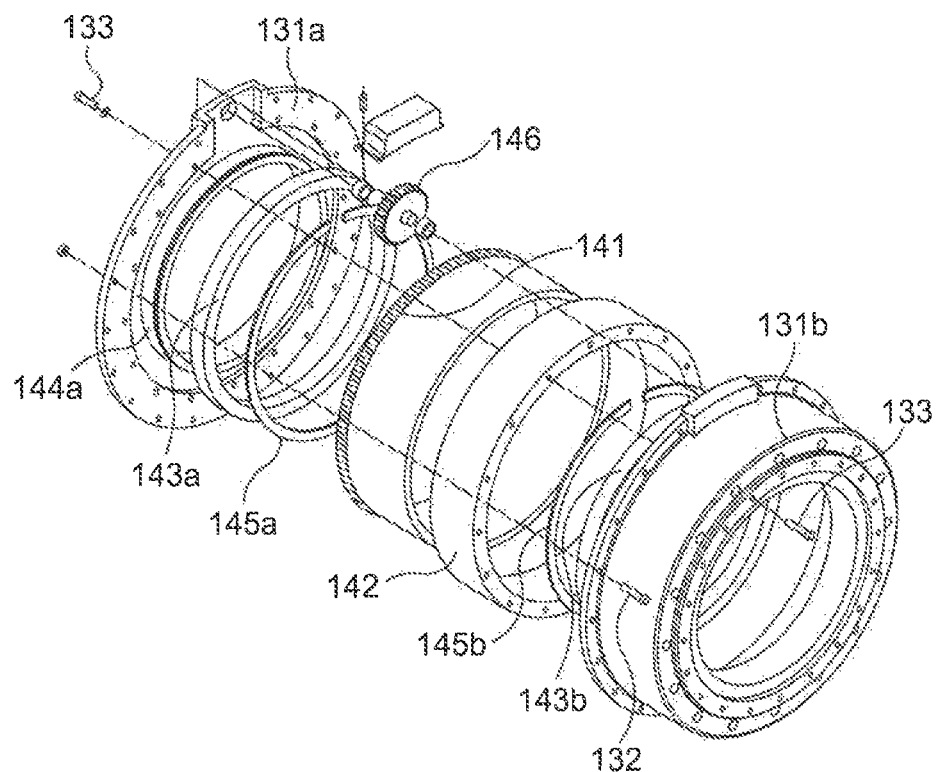
FIG. 5 is a pull-apart perspective representation of the parts of the electric motor of FIG. 4 in smaller scale.
Figure 6:
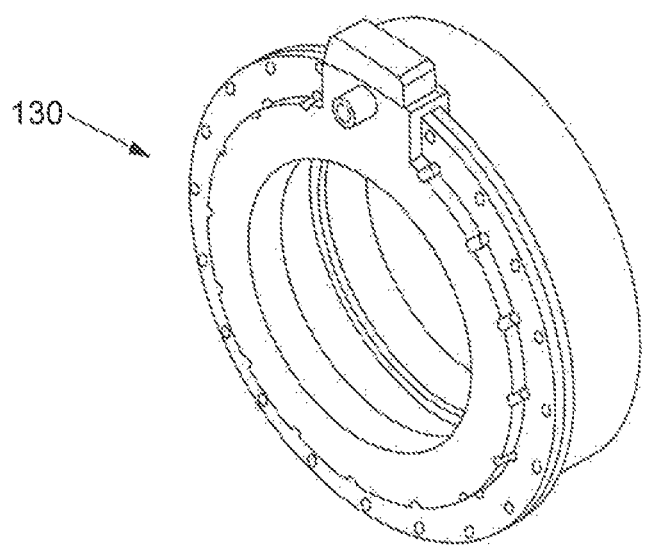
FIG. 6 is a perspective view of the motor of FIG. 4 when assembled in smaller scale still.
Figure 7:
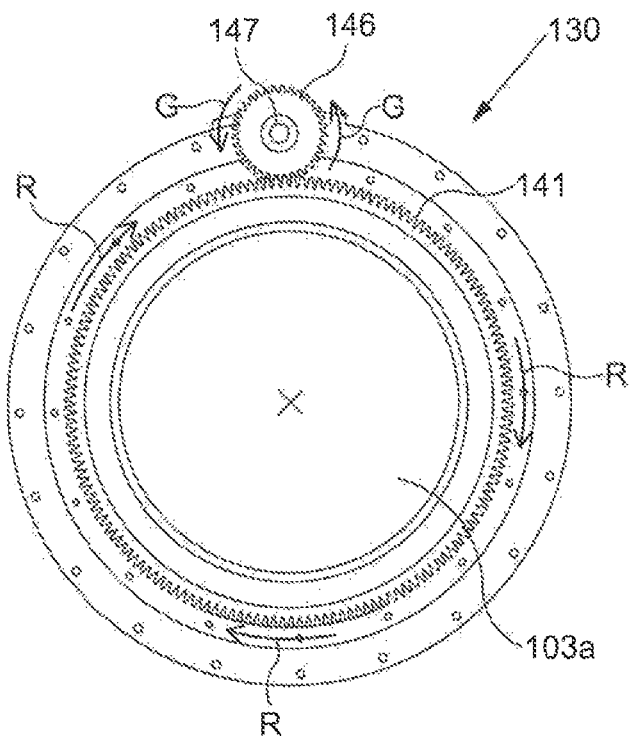
FIG. 7 is an end on view of the motor of FIG. 4 when assembled in larger scale.

In FIG. 5, the individual components for the assembly of the motor 130 are illustrated. In FIG. 6, an assembled unit of the motor 130 is depicted, and FIG. 7 highlights the arrangement of the planetary gear 146 of the motor 130. Referring to FIGS. 5 to 7, the rotor 141 rotates relative to the casing 131 and/or the stator 142 as indicated by the arrows R in FIG. 7. The rotation of the rotor 141 causes the gear 146 to turn as indicated by arrows G.

By being arranged ring-wise around the shaft, the motor 130 can be provided in a highly compact manner on the extender. When applied to an A-frame, the provided motor may advantageously be provided at a location along the extender close to the deck, which can facilitate access and service and maintenance.

Figure 8:
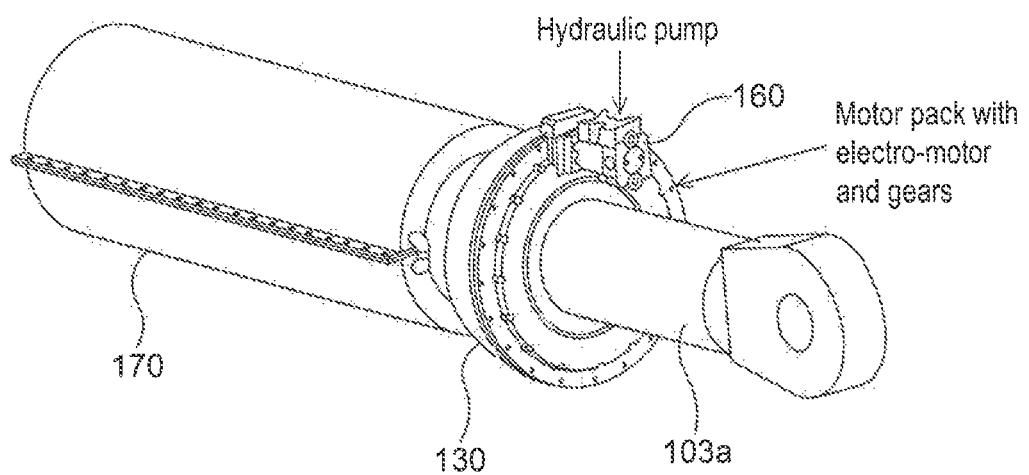
FIG. 8 is a perspective view of part of the electrohydraulic device of FIG. 2 in close up.

Turning now to FIG. 8, the shaft is shown with the motor 130 mounted to it and with the pump 160 connected so as to be driven by the motor 130 via the extension 147 of the gear 146. In addition, as seen in FIG. 8, the shaft is additionally provided with the tank 170 thereupon. The tank 170 has a wall extending around the shaft so as to define a storage region, for instance annular, for storing fluid in the tank in an annulus around the shaft of the section 103a of the extender. The pump 160 is driven by the motor 130 to pump fluid from the tank 170 to a hydraulic chamber of the extender for operating the extender. As can be seen, the pump 160 is positioned on an outside of the extender, and in a discrete location along the circumference around the extender.

The fluid in the hydraulic chamber is supplied in use to provide a pressure in the chamber for controlling the relative position of the first and second sections 103a, 103b of the extender. The hydraulic fluid may be applied in the chamber so as to transmit a force to the first and/or second sections 103a, 103b of the extender to drive the first and second parts of the extender 103 to extend or retract or to operate the extender so that the first and second parts maintain their configuration under an external load applied to the extender. The hydraulic chamber may be contained inside either of the first or second sections 103a, 103b of the extender.

Figure 9:
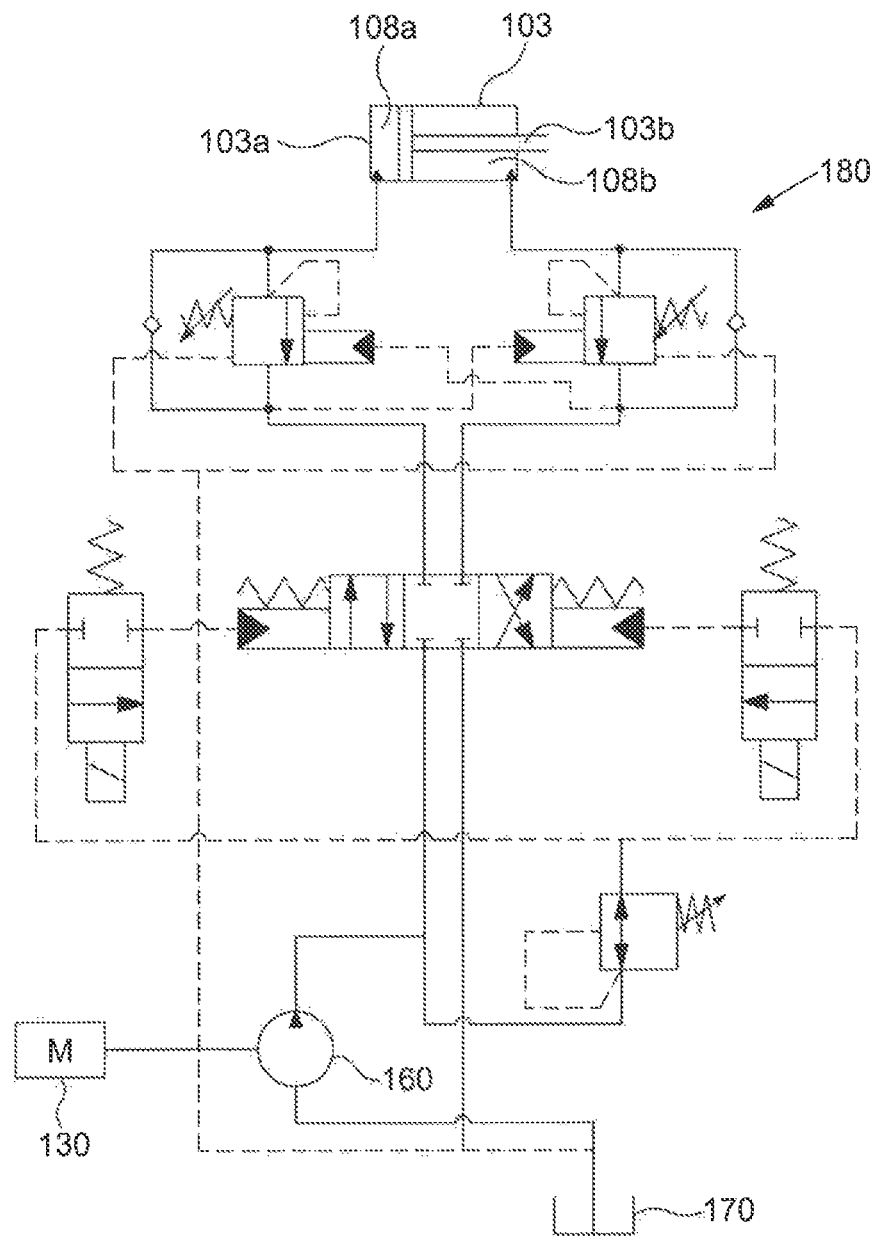
FIG. 9 is a diagrammatic representation of a hydraulic circuit for controlling and supplying hydraulic fluid to actuate an extender of the electrohydraulic device of FIG. 2.

The extender 103 is provided also with a hydraulic circuit 180 for operating it. A typical supply circuit 180 is exemplified diagrammatically in FIG. 9, where hydraulic fluid is supplied to first or second chambers 108a, 108b of the linear extender 103, and is extracted from the other one of the chambers 108*a*, 108*b*. Pipes for communicating hydraulic fluid are indicated by solid lines, and control lines for operating valves are indicated with dashed lines.

In embodiments described above, the extender can advantageously be provided with the circuitry and components necessary for powering the actuator in a compact and accessible assembly. This may provide significant space saving, reduce risks to personnel, and reduce downtime in the application of hydraulic cylinders applied to tilting, raising or lowering, or positioning A-frames, booms, or arms or the like or other large structures on marine vessels.

Various modifications and improvements may be made without departing from the scope of the invention that is claimed below.

The invention claimed is:

1. An electrohydraulic device comprising:
   an extender comprising a first section and a second section, wherein the first section is arranged to be axially translated relative to the second section by hydraulic fluid;
   an electric motor arranged on an outside of the extender, the electric motor including a rotor comprising an annular body which encircles the extender and is arranged to rotate about said extender; and
   a pump comprising a drive shaft, wherein the rotor is arranged to drive the pump for pumping and supplying the hydraulic fluid for operating the extender;
   wherein the rotor is coupled to the drive shaft through a gear arrangement comprising gears which have a gear ratio therebetween.

2. A device as claimed in claim 1, wherein the extender comprises a hydraulic cylinder and a rod, and the rotor is arranged to rotate about a part of either the hydraulic cylinder or the rod.

3. A device as claimed in claim 2, wherein the rod is movable with respect to the hydraulic cylinder to extend or retract to vary or obtain a desired amount of extension or elongation of the extender.

4. A device as claimed in claim 1, further comprising a stator of the electric motor, disposed on the extender, the stator and rotator being arranged to cooperate upon operation of the motor to generate torque to rotate the rotor.

5. A device as claimed in claim 4, wherein the stator is arranged around an outside of the rotor.

6. A device as claimed in claim 4, wherein the stator and the rotor are mounted inside a casing attached to the extender, the stator being mounted so as to be attached fixedly with respect to the extender.

7. A device as claimed in claim 1, further comprising a tank provided on or incorporated in a part of the extender, the tank being configured for storing hydraulic fluid.

8. A device as claimed in claim 7, wherein the tank has an annular or part-annular storage space for hydraulic fluid, where the storage space is disposed around a part of the extender.

9. A device as claimed in claim 1, operable for manoeuvring or supporting a structure that subjects the device to a load, wherein the structure is any of a boom, or an arm of a crane, or a leg of an A-frame.

10. A device as claimed in claim 9, wherein the extender is operable to extend to a desired extension so as to tilt the structure.

11. A marine vessel or platform comprising:
    a structure supported on a deck of the vessel or platform; and
    an electrohydraulic device as claimed in claim 1, connected to the structure, and operable to actuate the extender to manoeuvre or support the structure in position relative to the vessel or platform.

12. A method of using the electrohydraulic device as claimed in claim 1, the method comprising at least the step of operating the extender, using the electric motor so as to rotate the rotor about a part of the extender.

* * * * *